Figure 15:
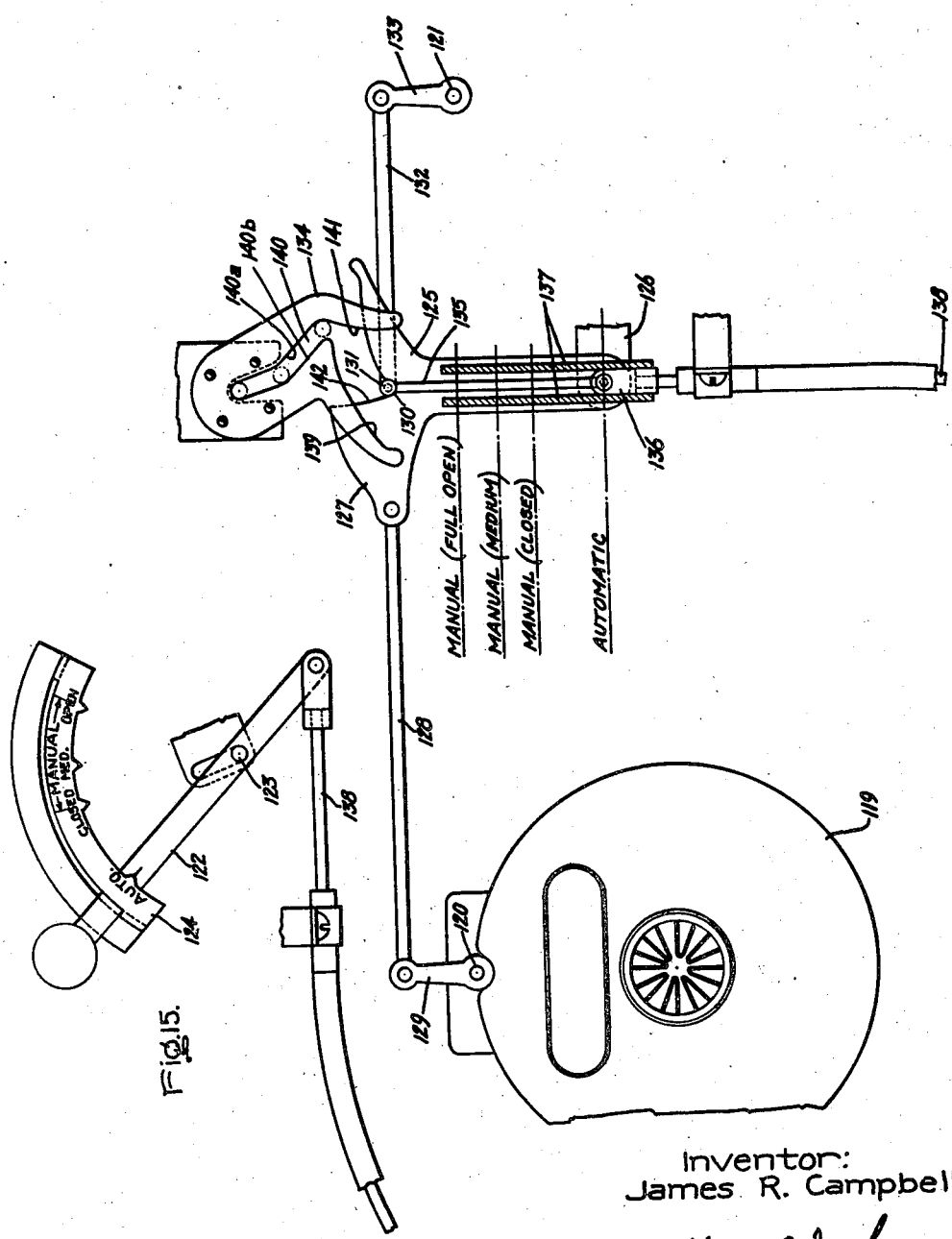

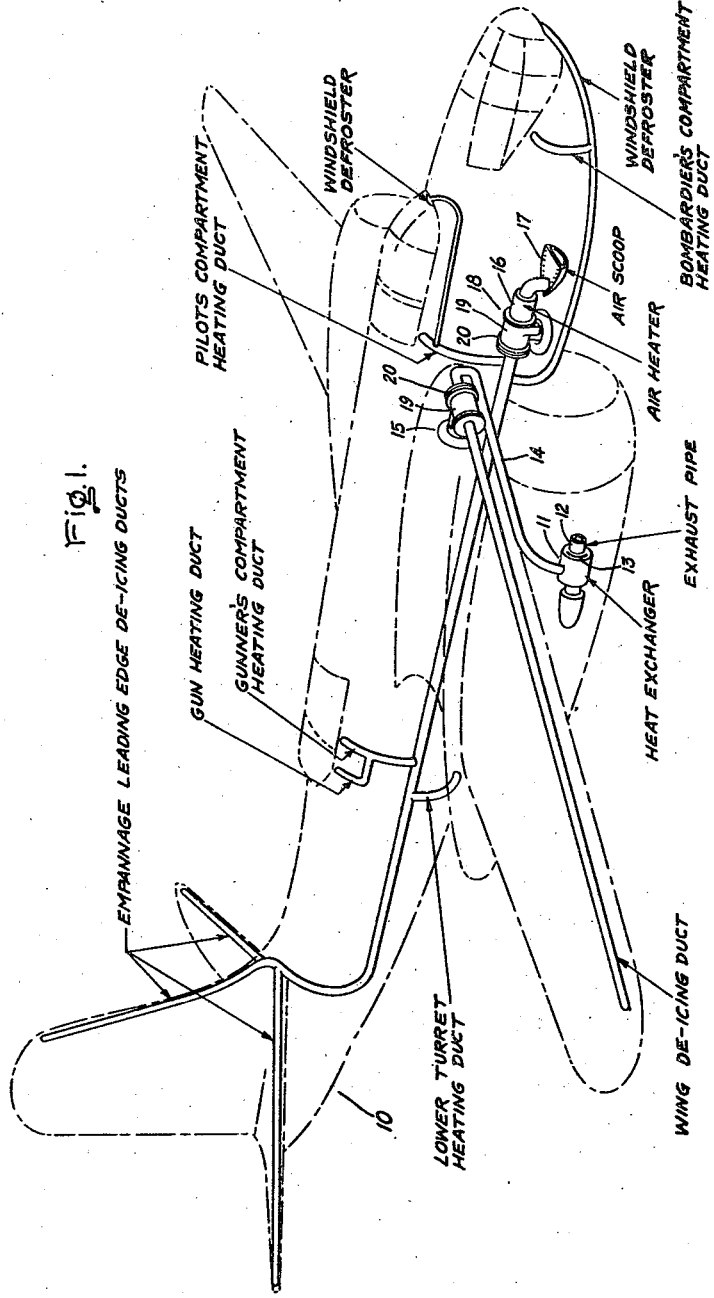

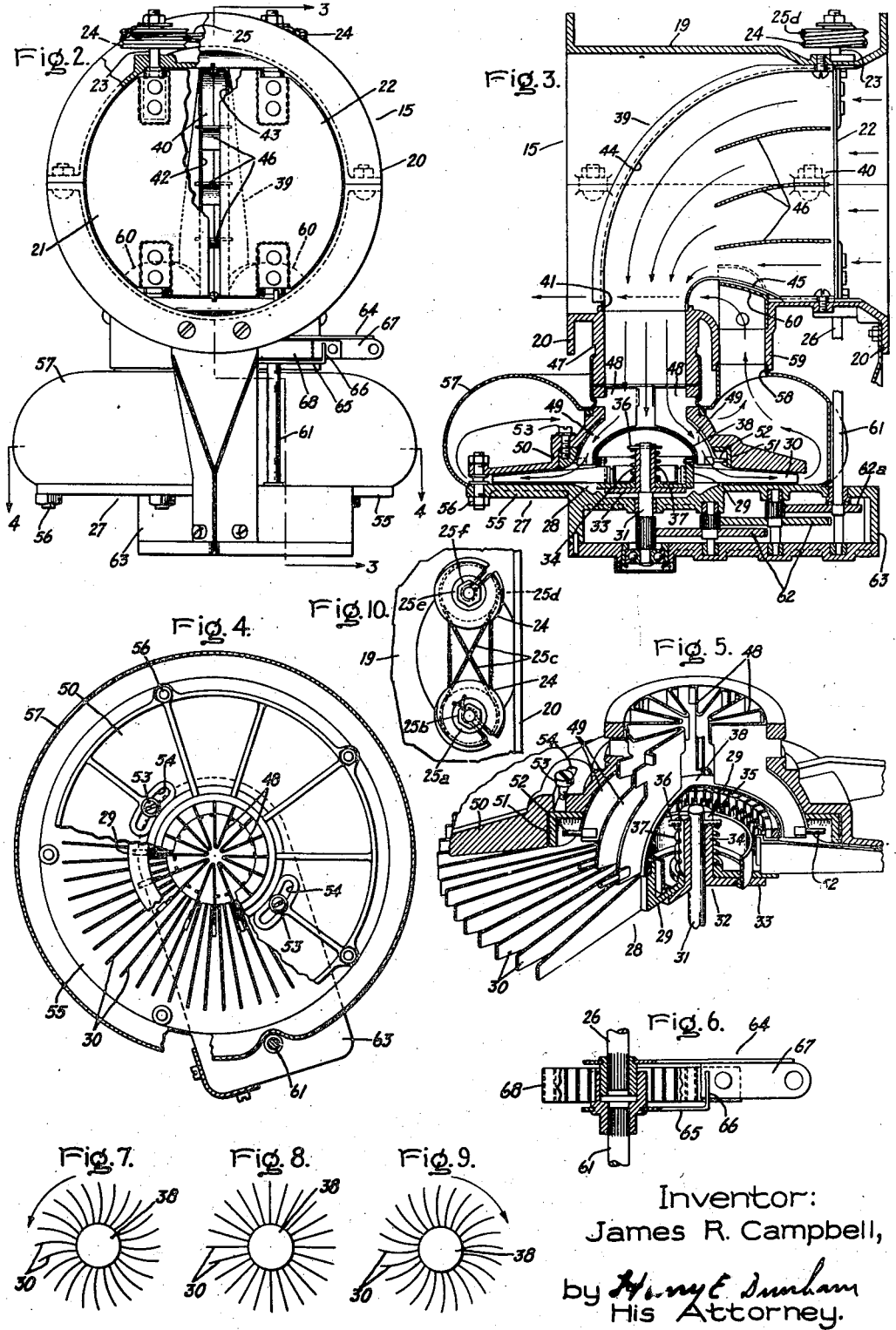
Feb. 11, 1947. J. R. CAMPBELL 2,415,672
THERMOSTATIC CONTROL DEVICE
Filed June 25, 1943 5 Sheets-Sheet 2
Inventor:
James R. Campbell,
by Henry E. Dunham
His Attorney.

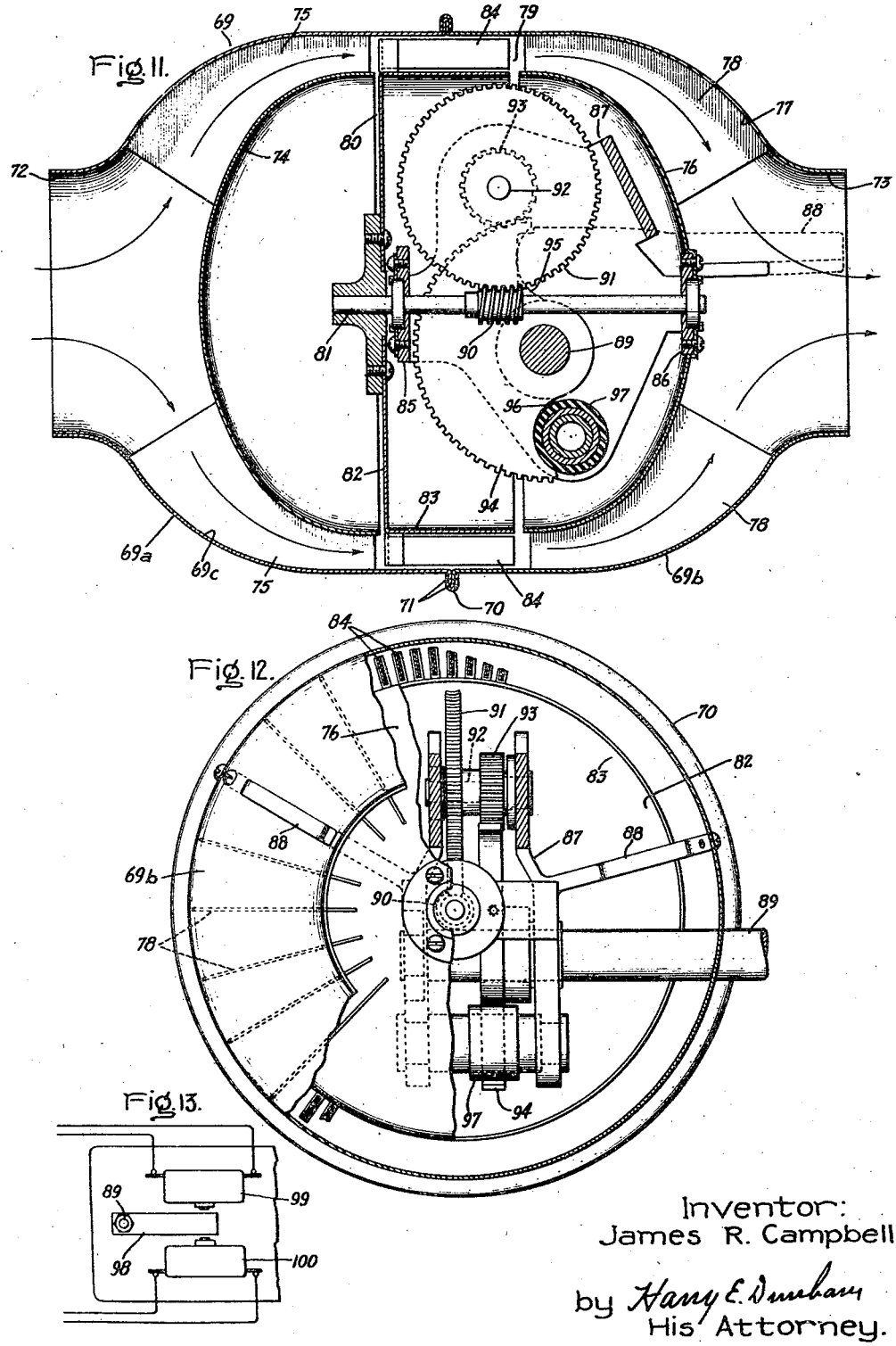

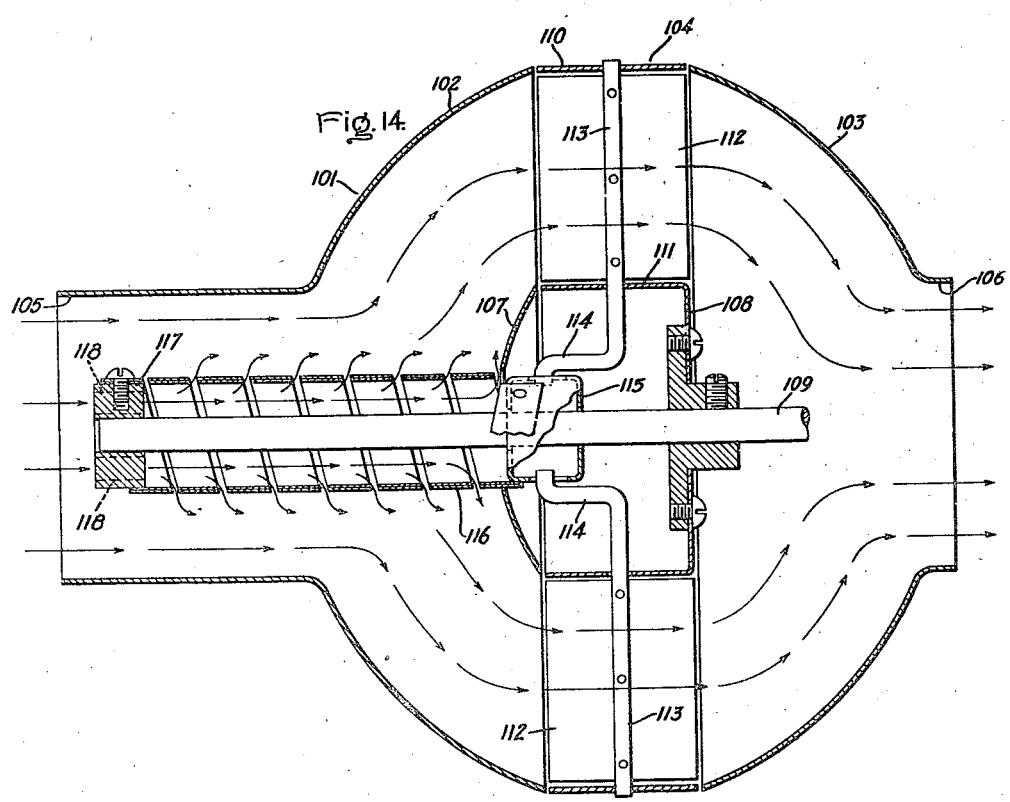

Feb. 11, 1947.            J. R. CAMPBELL            2,415,672
                       THERMOSTATIC CONTROL DEVICE
                         Filed June 25, 1943            5 Sheets-Sheet 5

Inventor:
James R. Campbell,
by Harry E. Dunham
His Attorney.

Patented Feb. 11, 1947

2,415,672

UNITED STATES PATENT OFFICE 2,415,672

THERMOSTATIC CONTROL DEVICE

James R. Campbell, Ontario, Calif., assignor to General Electric Company, a corporation of New York Application June 25, 1943, Serial No. 492,295

13 Claims. (Cl. 236—93)

This invention relates to a control device, more particularly to a control device for effecting a controlling action on a fluid responsively to the temperature of the fluid, and it has for its object the provision of a control device of this character which is of extremely simple and inexpensive construction, and yet which is extremely sensitive in its controlling action.

While having a variety of applications, this invention is particularly useful in controlling the rate of flow of a fluid as a function of its temperature.

And it is especially useful in controlling the temperature of a heated flowing fluid by varying the rate of flow of the fluid with reference to the heating means.

The control device arranged in accordance with this invention comprises a fluid control element which in its turn is controlled by means of a turbine which is operated by the flowing fluid. The blades of the turbine are positioned with reference to their rotor in accordance with the temperature of the controlled fluid. Thus, when this temperature is above a critical predetermined value, the blades are set so as to cause the rotor to rotate in one direction, whereas when the temperature of the fluid is below this critical value they are positioned so as to rotate the rotor in the opposite direction. The movements of the rotor in the two directions control the control element to effect a predetermined controlling action on the fluid.

Where the device is used to control the rate of flow of the fluid through the heating unit to control the fluid temperature, the control element increases the rate of flow of the fluid should the temperature be too high so that less heat is imparted to it, whereas it decreases the rate of flow if the temperature is too low so as to increase the amount of heat imparted to the fluid. When the fluid temperature is at the correct value the blades are set so that the rotor does not move at all and the control element does not effect any controlling action on the fluid which would change its temperature.

For a more complete understanding of this invention, reference should be had to the accompanying drawings in which Fig. 1 is a perspective view of an airplane provided with a number of air heating ducts and heating means for heating the air supplied to the ducts, and the ducts being provided with control units arranged in accordance with this invention so as to hold substantially constant air temperatures in the ducts; Fig. 2 is a front elevation of a control device embodying this invention and which is utilized in the plane of Fig. 1; Fig. 3 is a sectional view taken through the line 3—3 of Fig. 2 and looking in the direction of the arrows; Fig. 4 is a sectional view taken through the line 4—4 of Fig. 2 and looking in the direction of the arrows; Fig. 5 is a fragmentary perspective view, with parts in section, illustrating certain of the elements of the control device of Figs. 2–4; Fig. 6 is a fragmentary elevation illustrating certain elements of the control device of Figs. 1–5; Figs. 7, 8 and 9 are diagrammatic representations of the turbine rotor wheel and its blades, illustrating various positions of the blades corresponding to various temperatures of the controlled fluid; Fig. 10 is a fragmentary plan view illustrating a portion of the mechanism shown in Figs. 1 and 2; Fig. 11 is a vertical sectional elevation view of a modified form of this invention; Fig. 12 is a fragmentary vertical sectional view taken through Fig. 11; Fig. 13 is a fragmentary side elevation illustrating a portion of the mechanism of Figs. 11 and 12; Fig. 14 is a longitudinal vertical sectional view of another embodiment of this invention; and Fig. 15 illustrates a combined automatic and manual control arrangement for the fluid controlling element.

Referring more particularly to Figs. 1–9 inclusive, this invention has been shown as applied to the control of the temperature of the heated air utilized in an aircraft 10 (Fig. 1) to heat the empennage leading edge de-icing ducts, wing de-icing ducts, turret heaters, gun heating ducts, windshield defrosters, and the like, all of which ducts are denoted in Fig. 1 by appropriate designations.

As shown in Fig. 1, there are two heating systems used, one system for heating the air for the wing de-icing ducts, and another system for heating the air for the remaining ducts. The first system comprises a heater 11 which is of the heat exchanger type, the heat exchanger being heated by the exhaust gases from the airplane motors; the exhaust pipe is indicated by the numeral 12. It will be understood that this heater will comprise an opening 13 through which the air may flow into the system, and that this air in flowing through the exchanger is heated by the exhaust gases, the heated air flowing through a feed duct 14 and to the wing ducts through a control device 15, constructed and arranged in accordance with this invention. The second heating system comprises an air heater 16 which may be of any suitable character, such as a gasoline air heater. Air is fed into this heater by means of a scoop 17, and the heated air flows through a control device 18, which is constructed and arranged in accordance with this invention, and which is identically the same as the control element 15, and which feeds the heated air to the remaining ducts of the second system, as clearly indicated in Fig. 1.

Inasmuch as the control elements 15 and 18 are of identically the same construction that of the element 15 only will be described in detail.

The details of construction of this element are shown in Figs. 2–9 inclusive.

As shown in these figures, this control device comprises a relatively short cylindrical duct-like member 19 which is provided on its opposite ends with flanges 20 whereby it may be connected into the controlled duct system, as shown in Fig. 1.

The flow of fluid through the duct 19 and hence through the duct system is controlled by means of a pair of shutters 21 and 22 which are mounted in the entrance end of the duct 19, which is the right-hand end of the duct as viewed in Fig. 3. Each of these shutters is of substantially semi-circular shape, and it is pivotally mounted to the casing 19 by means of shafts 23. The axis of rotation of each of the shutters is so located that the pressures of the fluid on the shutter areas on opposite sides of the axis are substantially balanced. The upper shafts 23, as viewed in Figs. 2 and 3, are provided with pulleys 24 located outside of the casing, as shown, and each pulley is provided with a thread-like groove. Interconnecting the two pulleys is a non-extensible cord 25 which may be formed of any suitable material, such as woven steel wire; this cord has its two ends secured to one pulley by means of a washer 25a and a nut 25b, as shown, and from these ends two lengths 25c of the cord cross each other and are connected to a loop 25d wound on the other pulley, and which loop is secured to this other pulley by means of a washer 25e and nut lock 25f. Because of this arrangement the cord is reversely wound upon the pulleys, whereby when one of the shutters is rotated, the other is rotated with it, but in the opposite direction, so that the two shutters swing toward their open and closed positions in unison.

The right-hand shutter, as viewed in Fig. 2, has a driving shaft 26 extending downwardly from the duct 19, as shown in Fig. 3. The shaft 26 is driven by suitable temperature responsive control means 27 which, as shown, is located below the duct member 19, as viewed in Figs. 2 and 3. This control comprises an impulse turbine wheel 28 which is provided with a rotor 29 that carries a plurality of impulse blades 30 extending radially therefrom, as clearly shown in Figs. 3, 4 and 5. The rotor 29 is secured to a shaft 31 which is the output shaft of the temperature control unit and which functions to drive the shutters.

As shown, the rotor 29 is of cup-shape with the blades 30 fastened to the upright wall of the cup member. This member has a driving connection with the shaft 31 through a friction clutch 32 which comprises a disk 33 which has a tubular section 34 surrounding the shaft 31. This section 34 at its top is provided with transverse slots 35 for receiving a pin 36 which extends through an aperture provided for it in the shaft 31 and which, therefore, effects a driving connection between the disk 33 and the shaft 31. The bottom surface of the bottom wall of the cup-shaped rotor 29 is pressed firmly against the upper surface of the disk 33 by means of a compression spring 37 which surrounds the sleeve 34 and which has its lower end bearing on the cupped member and which has its top bearing against the projecting ends of the pins 36. The cup-shaped rotor is provided with a dome-shaped cover 38.

The impeller blades 30, as shown, have their inner ends rigidly secured to the upright wall of the cup-shaped rotor 29, while their outer ends extend radially outwardly from this wheel. These blades are formed of a thermally responsive material, and preferably will be formed of a bimetallic thermostatic material; it will be understood that such material is formed of two metals having dissimilar temperature coefficients of expansion rigidly secured together from end to end and, which, therefore, function to deflect the blade in one direction or the other, the direction depending upon whether the temperature be elevated or lowered.

The blades 30 are operated by the fluid flowing in the duct system and the positions that they take with reference to their rotor depends upon the temperature of this fluid. In order to direct the fluid to the turbine blades and to insure that the fluid delivered is representative of that flowing through the duct system, I provide in the housing 19 a sampling scoop 39 which has an entrance end 40 facing "up stream" and at which end it has a relatively narrow rectangular section, as shown in Fig. 2, but which extends vertically completely across the full height of the duct. This scoop has a substantially circular discharge port 41 at the bottom of the duct, and connecting the forward opening 40 to the discharge opening 41 are a pair of side walls 42 and 43 having a curved rear wall 44, as shown, and having a bottom wall 45 also curved. Furthermore, interposed between the side walls 42 and 43 are a series of vertically spaced curved guide vanes 46, which divide the entrance end into a plurality of "pick-up" areas, and which straighten and even out the flow of the various sections of the fluid entering the opening 40, and also generally direct this fluid down toward the discharge opening 41.

It will be observed that the scoop 39 samples fluid from parts of the complete cross-sectional area of the duct and thereby insures that the turbine blades are subjected to a temperature which is the average temperature of the fluid flowing through the duct system.

The fluid taken by the sampling member 39 and discharged at the opening 41 passes through a duct 47 depending from the bottom of the duct 19 and feeds it into the turbine. This fluid first passes through a series of guide vanes 48 which, as more clearly shown in Fig. 5, are generally radially positioned with reference to the axis of rotation of the turbine rotor 29 and which have curved extensions 49 extending outwardly and downwardly over the cover 38 of the rotor and which terminate but a short distance above the plane of movement of the blades 30. The upper ends 48 of these guide vanes are rigidly secured to an upper housing 50 provided for the turbine. The lower sections 49 of the guide vanes are secured to an adjustable ring 51 mounted in the housing member 50; for this purpose, each of the sections 49 is provided with an outwardly extending pin 52 which is secured to the ring 51. For a purpose which will be described in greater detail hereinafter in connection with the description of the operation of the unit, this ring 51 may be rotated relatively to the housing 50 to a limited extent, and for this purpose, the ring is secured to the housing by set screws 53 which, as shown more clearly in Figs. 3 and 5, are threaded into the ring and which are directed through elongated slots 54 provided for them in the housing 50 and the heads of which overhang the edges of the slots. It will be understood that when the screws are loosened the ring may be rotated in order to shift the positions of the vane sections 49 in unison, whereas when the screws are tightened the ring is secured in its adjusted position.

The general function of these vanes is to straighten out the fluid flow and to direct it to the inner ends of the turbine blades 30.

Mating with the top housing wall 50 of the turbine is a bottom housing wall 55 which is secured to the top wall in spaced relation with it by screw fastening means 56 so that the two walls house the turbine rotor 28 and the radially extending blades 30.

The fluid which flows from the vanes 48 to the inner ends of the blades 30 flows radially through the blade section of the housing and outwardly from it through the annular outer space between the housing members 50 and 55 into a collector ring 57. This ring 57 has a discharge opening 58 that discharges into a duct 59 extending downwardly from the bottom wall of the duct 19 close to the duct 47, as shown in Fig. 3, and from this duct it is discharged into the duct 19 in the "down stream" direction through a return outlet member 60.

The rotation imparted to the turbine shaft 31 by the rotation of the rotor 28 is used to control the positions of the two shutters 21 and 22, and for this purpose the shaft operates an output shaft 61 through a reduction gear train 62 which drives a gear segment 62a secured to the shaft 61. The gearing is mounted in a gear housing 63 located below the turbine lower housing plate 55, as clearly shown in Fig. 3. The shaft 61 drives the shutter shaft 26 through a suitable over-ride mechanism 64 shown more clearly in Figs. 2 and 6. This mechanism comprises an arm 65 which is rigidly secured to the upper end of the shaft 61 and which has an upwardly projecting section 66 which is adapted to drive an arm 67 secured to the shaft 26. A coiled tension spring 68 has one end secured to this arm 67 and its other end secured to the shaft 61 so that it biases the arm 67 against the upright extension 66. Therefore, when the shaft 61 is rotated in the direction to open the shutters its extension 66 forces the arm 67 with it to open the shutters, whereas when the shaft 61 is rotated in the opposite direction to tend to draw the extension 66 away from the arm 67, the spring 68 will force the arm 67 to follow the extension 66 and will function to close the shutters.

This over-ride mechanism 64 provides means for manually opening the shutters if it should be desired to do so independently of the operation of the turbine and for a purpose to be described later.

The control unit, just described, has for the purpose of illustration been shown as applied to control the temperature of the air feed to the various heating ducts of the airplane 10; in each of the heating systems shown in Fig. 1, the temperature of the air delivered to the ducts is controlled by varying its rate of flow with reference to the respective heater 11 or 16. It will be understood that if the rate of flow be decreased then necessarily each unit of air will pick up more heat from its heater and its temperature will increase, whereas if the rate of flow be increased it will pick up less heat from its heater and its temperature will be reduced. The turbine functions to control the shutters to thus control the rate of flow responsively to the temperature of the air itself that is picked up by the sampling scoop 39 in order to hold substan- In the operation of the heating system for the empennage leading edge de-icing ducts, for the windshield de-frosters and for the various heating ducts connected to the heating system heated by the heater 16, it will be understood that the air will be introduced into the system by means of the air scoop 17. This air will flow through the heater 16 so as to be heated thereby and will be delivered to the duct 19 of the control unit 18, the air flowing through this duct, providing the shutters be in an open position, and thence into the various feed ducts of the system. If the temperature of the fluid flowing through the duct 19 be at the desired value, the blades 30 will be straight, as shown in Fig. 8, and the turbine will remain stationary holding the shutters in a corresponding open position. However, if the temperature should fall below the desired value, the blades will curve in the counterclockwise direction from the position of Fig. 8 to some position such as shown in Fig. 7. Here, it is to be noted that the blade curvature shown in Figs. 7 and 9 is somewhat exaggerated for the sake of clarity of illustration. However, they do curve in the general direction of Fig. 7 and when they curve in this way they act as impulse turbine blades, the air being fed to the blades causing rotation thereof in the direction of the arrow shown in Fig. 7. This operation of the turbine will rotate the shutters in a direction to move them toward the closed position which will restrict the rate of flow and hence will heat the air to a higher temperature in order to restore it to the desired temperature value. On the other hand, if the temperature should be too high, the blades will deflect in the other direction toward some position, such as shown in Fig. 9, which will reverse the direction of rotation of the rotor and move the shutters farther toward the open position which will speed up the flow of the air, and thus reduce its temperature. In this way the turbine functions automatically to hold a desired temperature in the duct system.

The same is true of the other system shown in Fig. 1, the control 15 operating in precisely the same way to hold the desired temperature in its controlled duct system.

In order to change the temperature setting of the control unit so as to change the temperature held in the controlled fluid, the vanes 49 are adjusted by the rotatable ring 51 in either direction from its normal central position. When so adjusted the direction of flow of the fluid approaching the rotor blades is varied. This will result in the raising or lowering of the control point of the temperature. And when the vanes 49 are so adjusted, the blades 30 will take some curvature for the stationary position of the turbine different from the straight line position of Fig. 8, the curvature, of course, depending upon the direction and extent of movement of the vanes 49.

In this particular application, the over-ride mechanism 64, previously described, is for the purpose of permitting manual opening of the shutters, if for any reason it should be desired to lower the temperature in the heating ducts, irrespective of the condition of operation of the turbine. It is in general, a safety feature, and is provided to lower the temperature if for any reason the control unit should become inoperative or should not be functioning properly, and it is provided to prevent overheating of the ducts. It will be observed that in order to thus manually open the shutters it is merely necessary to manually move the arm 67 away from its operating projection 66 that is fastened to the operating shaft 61.

It is to be observed that when the shutters are completely closed, as shown in Fig. 2, the scoop 39 is not closed to the flow of fluid. In other words, the scoop remains open so that fluid can circulate to the turbine whose blades will continuously test the temperature of the fluid. Otherwise, once the shutters become closed the turbine wheel could not test the fluid temperature and respond to any change in its temperature condition.

In the form of the invention shown in Figs. 11, 12 and 13, the turbine wheel is not located in a bypass located outside of the main fluid duct, as in the first form of the invention described, but is located directly in the air stream path.

Here, there is provided an outer casing 69 which is arranged to be inserted directly into the duct of the fluid to be controlled. For example, it would be connected in place of the unit 15 or 18 of Fig. 1 directly into the duct system. The shell 69 comprises similar end sections 69a and 69b which are secured together at the middle of casing 69 by means of a beading 70 which is clamped on outwardly extending flanges 71 provided on the adjacent ends of the two shell sections, as shown. The shell 69a tapers down to a relatively small entrance opening 72, while the shell 69b tapers down to a similar outlet opening 73.

The inner surface 69c of the curved portion of the shell 69a between its inlet opening 72 and its other end constitutes an outer faring, and coacting with this faring is a wall 74 constituting an inner faring. The controlled fluid is caused to enter the passageway 72 and then is diverted outwardly through the passageway between the inner and outer farings. Interposed in this passageway are a series of spaced inlet guide vanes 75 which have their planes radially positioned with reference to the longitudinal axis of the casing member 69a, and these vanes coact with the inner and outer farings in order to provide a normal and stream line flow of the fluid as it is about to leave the shell section 69a.

It will be observed that the shell section 69b is similarly constructed, being provided with inner and outer faring surfaces 76 and 77, and with outlet guide vanes 78. These farings and vanes tend to straighten out the fluid as it flows out of the control unit.

Housed by the casing member 69 and mounted between the two faring sections of the inlet and outlet shells 69a and 69b is a turbine 79 comprising a rotor 80 which is mounted upon a shaft 81, the longitudinal axis of which coincides with the longitudinal axes of the two shell members. The rotor, as shown, has a pan-like shape with its bottom wall 82 positioned vertically and its side wall 83 positioned horizontally. It will further be observed that the side wall 83 in effect joins the two inner faring members 74 and 76, being, in effect, a continuation of these members.

Mounted upon the periphery of the rotor, that is, upon the side wall 83 are a plurality of impulse blades 84 in the form of bimetallic thermostatic bars extending lengthwise of the side wall 83, as clearly shown in Fig. 11. The left-hand or "up stream" ends of these blades, as viewed in Fig. 11, are rigidly secured to the rotor, while the right-hand or "down stream" ends are free to move laterally responsively to temperature changes. It will be observed that in view of the foregoing arrangement, the blades 84 lie within the space between the rotor wall 83 and the outer casing between the guide vanes 75 and 78, and therefore, all of the fluid which is caused to flow into this space is caused to move through the blades and into the outlet section 69b.

The shaft 81 is mounted in supports 85 and 86 provided for it on a base member 87. This member is provided with a plurality of spaced supporting arms 88 (Fig. 12) which are attached to the outer walls of the casing 69b.

The shaft 81 is connected to an output or takeoff shaft 89 (Figs. 12 and 13) through a worm gear 90 mounted on the shaft 81 and which meshes with a worm wheel 91. The worm wheel 91 is mounted on a shaft 92 journaled in base 87 and which drives a spur gear 93; and this gear 93 meshes with a gear segment 94 secured to the output shaft 89. This gear segment 94 is provided with oppositely positioned arcuate surfaces 95 and 96 which are arranged to coact with a suitable stop member 97 to limit the arcuate movement of the segment 94 in opposite directions, and hence limit the rotation of the shaft 89 in opposite directions.

It will be understood that in the operation of this form of the invention, the controlled air will flow from the heater into the opening 72, and it will be constricted by the inner and outer farings and the guide vanes 75 so that it has a normal and stream line flow as it enters the blades 84. It will be further understood that if the fluid does not have the desired temperature the blades will be deflected in one way or the other so that the turbine will rotate in one direction or the other to rotate the shaft 89 in one direction or the other, the direction, of course, depending upon whether or not the temperature is above or below the critical temperature. And it will be further understood that this motion of the output shaft will be used to control a suitable control element to restore the temperature to the desired value.

While the fluid control element operated by the shaft 89 has not been disclosed in this embodiment, it will be understood that it may be shutters, such as shown in the first form, or it may be any other suitable controlling element. For example, this shaft may operate a suitable reversing switch for an operating motor, which motor may be used to drive a shutter connected in the duct, or the motor may be used to control the heating means directly, or effect any other suitable controlling action which will result in a control of the temperature of the fluid. As shown in Fig. 13, the shaft 89 drives a switch operating arm 98 which coacts with a pair of switches 99 and 100. It will be understood that these switches may be used to control a motor or any other suitable controlling agency. For example, they may be used to control the forward and reverse field winding of a suitable operating motor.

In the form of the invention shown in Fig. 14, the rotor blades themselves are not formed of the thermostatic material, but a separate thermostat is arranged to rotate with them and it is connected with them in order to change their operative positions relative to their rotor.

As shown, this control device comprises an outer casing 101 formed in sections 102 and 103 which have generally the same form and between which is arranged to rotate a turbine 104. The casings 102 and 103 are shaped in general like the corresponding casings of the second form of this invention, the casing 102 having a relatively small "up stream" inlet opening 105 while the casing 103 is provided with a relatively small discharge "down stream" opening 106. In the inlet opening there is provided an inner faring 107.

The turbine 104 comprises a cup-shaped rotor 108 mounted upon a shaft 109 which will be journaled in suitable bearings (not shown) provided for it. The turbine further comprises an outer ring 110 which is arranged concentric to the side wall 111 of the cup-shaped rotor 108. And between the side wall 111 and the outer ring 110 are a plurality of impulse blades 112.

Each blade is mounted upon and secured to a shaft 113 which has a crank arm 114 received in an adjustable mount 115, as clearly shown in Fig. 14.

The adjustable mount 115 is mounted on the inner end of a helically wound thermally responsive member 116 which has its other end rigidly secured to a disk-like plate 117 which is secured to the shaft 109. The helically wound member 116 preferably will be made of bimetallic thermostatic material so that it will wind and unwind as its temperature changes.

It will be observed that when the position of the mount 115 is changed by the coil 116 the crank arms 114 will be operated to shift the positions of the shafts 113 and thereby shift the positions of the turbine blades 112. The member 117 is provided with a series of apertures 118 so that the fluid entering the unit can pass into the helix 116 as well as around the outside of it.

In the operation of this form of the invention, it will be understood that when the temperature of the controlled fluid is at the critical value, the thermal member 116 will hold the blades 112 in such a position that the rotor does not rotate to effect any controlling action. However, if the temperature be above or below the critical value the thermal element 116 will wind or unwind, as the case may be, in order to properly set the blades 112 for imparting to the shaft 109 the correct speed and direction of rotation to restore the temperature.

It will be understood that the shaft 109 will drive any suitable control element for controlling the temperature of the fluid, such as shutters as shown in the first form of the invention, or switching means as shown in the second form.

In some applications it is desirable to superimpose upon the automatic control of the fluid control element a manual control therefor. In Fig. 15, there is illustrated such a system of control. Here, the temperature control unit is indicated by the numeral 119 and its output shaft is indicated by the numeral 120. The control element here is assumed to be the shutter control of the first form of this invention and the shutter operating shaft is indicated by the numeral 121.

The shaft 120 is interconnected mechanically with the shaft 121 for effecting continuous automatic operation of the shutters responsively to the temperature changes of the fluid, and the connection means is controllable at will to remove the shutter shaft 121 from automatic control and to transfer it to a manual control.

As shown in Fig. 15, the manual control consists of a lever 122 having a pivot 123 located intermediate its ends. This lever operates against a suitable indicating slide member 124 which is provided with suitable indications for the various controlling positions of the lever such as "Auto," corresponding to the automatic control position, and a manual range indicated "Manual," which range is subdivided into the indications "Closed," "Medium" and "Open" corresponding to the fully closed, medium, and fully opened positions of the shutters.

The mechanical drive between the control unit shaft 120 and the shutter shaft 121 comprises a lever arm 125 having its lower end, as viewed in Fig. 15, mounted upon a fixed pivot 126. This arm, as shown, is roughly in the form of a T. The left-hand end 127 of the cross-bar of the T member is mechanically interconnected with the shaft 120 by means of a link 128 which has one end pivoted to the end 127 and its other end pivoted to a crank arm 129 which is driven by the shaft 120. Also arranged in this cross-bar of the T and substantially midway between the ends thereof is a circular notch 130 which is adapted to receive a roller 131 mounted upon one end of a link 132, the opposite end of which is pivoted to a lever 133 which drives the shutter shaft 121.

It will be observed that as long as the roller 131 is located in the notch 130, a direct driving connection is effected between the output shaft 120 of the control unit and the shutter shaft 121, and that as the crank arm 129 is oscillated by shaft 120, the shutter shaft 121 likewise will be oscillated between shutter "open" and shutter "closed" positions. When the roller 131 is in its notch the system functions as does the first form of this invention.

In order to remove the automatic control from the shutters and to supplant it with the manual control, the roller 131 is removed from the notch 130, and in addition, a fixed cam plate member 134 is provided which has a plurality of surfaces arranged in predetermined relation for engagement with the roller 131 so as to control the position of the shutters.

The roller 131 is shifted from the notch 130 and its position thereafter controlled from the manually operated lever 122 by means of a link 135 which at its upper end, as viewed in Fig. 15, supports the roller 131 and which has its lower end pivoted to a vertically adjustable block 136. This block slides in vertically arranged guides 137. The position of the block and hence of the lower end of the link 135 is controlled from the lever 122 by flexible cable 138 which has one end connected to the block and its opposite end connected to the lower end of the lever, as shown in Fig. 15.

The fixed cam plate 134 is provided with a surface 139, and with a slot 140 arranged at an angle to the surface 139, as shown, and which slot has upper and lower guide surfaces 140a and 140b, all of which surfaces function to control the action of the roller 131.

In the operation of this over-ride mechanism, it will be understood that when the lever 122 is in its automatic position, as shown, the roller 131 will be located in the notch 130 and the center of movement of the link 135 will be coincident with the center of movement of the T-shaped lever 127, and that under these conditions there will be a direct mechanical drive from the temperature control unit 119 to the shutters operated by the shaft 121, and the shutters will be automatically controlled.

Now if it be desired to shift to manual control, the lever is moved in a clockwise direction from its automatic position into its manual range of control. When it is thus moved it elevates the block 136 and thereby removes the roller 131 from the notch 130 and into contact with the surface 139. This operation moves the lever 133 clockwise toward the shutter "closed" position, the shutters being completely closed when the roller reaches the end of the surface 139 and is about to enter the slot 140; the member 134 is provided with a guide surface 141 opposite the surface 139 to direct the roller into the slot. If it now be desired to open the shutters the lever 122 will be rotated farther in its clockwise direction, and as it is so moved, the roller 131 is pushed up into the slot and is engaged by the surface 140a which draws the roller toward the left and thereby rotates the shutter shaft 121 counterclockwise; this operation of the crank 133 moves the shutters from their fully closed position toward their fully open position, and as the lever 122 is advanced in the clockwise direction the shutters are moved more and more toward their open position, until when the lever reaches its extreme right-hand position indicated "Open" on the scale 124, the shutters will be completely opened. Now if the lever 122 be rotated counterclockwise the roller will engage the surface 140b of the slot, and will shift the shutter lever 133 clockwise to again move it toward its closed position. In this way the shutters can be adjusted to any position between fully closed and fully opened positions. If it be desired to again place the shutters under automatic control it is merely necessary to return the lever 122 to its automatic control position "Auto."

The cross-bar of the T in its top edge is provided with a relatively wide, roughly V-shaped notch 142 above the notch 130 so that the member can be oscillated by the control unit 119 when the shutters are under manual control, irrespective of where the roller 131 happens to be located.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device for controlling a flowing fluid comprising, a duct through which fluid flows, a turbine wheel in said duct having blades acted upon by the flowing fluid so as to control the rotation of said wheel, said blades being thermally responsive to the temperature of said fluid so that their positions with reference to the wheel vary with temperature changes both to control the speed of said wheel and also its direction of rotation depending upon whether said temperature is above or below a predetermined value, and temperature control means actuated by said wheel for controlling the temperature of said fluid.

2. In a system of fluid flow having means for heating said fluid and wherein the temperature of said fluid is a function of the rate of flow of the fluid with relation to said heating means, means for controlling the flow of said fluid comprising, a flow control member, a turbine wheel, connection means between said wheel and said flow control member for actuating said flow control member to controlling positions to vary said rate of flow, the wheel when rotated in one direction operating the flow control member to increase the rate of flow of said fluid and when rotated in the opposite direction to decrease the rate of flow of said fluid, said wheel having actuating blades formed of temperature responsive material so that the curvature of the blades changes with temperature changes, the blades curving in one direction when their temperature is above a predetermined value to cause rotation of said wheel in said one direction and curving in the opposite direction when the temperature is below said predetermined value to cause rotation of said wheel in said opposite direction and said blades taking a position to hold said wheel stationary when said temperature is at said predetermined value, and means for ducting controlled fluid through said blades to control the operation of said wheel.

3. A control device for a fluid comprising a turbine wheel provided with temperature responsive operating blades, the positions of said blades with reference to said wheel depending upon their temperature, a duct for conveying said fluid, said turbine wheel being located outside of said duct, a sampling scoop for picking up fluid from said duct from various sections of an area extending crosswise thereof, means directing the fluid picked up by said scoop through said blades and then for returning it to said duct, and means controlled by said wheel for controlling the temperature of said fluid.

4. A control device for a fluid comprising a turbine wheel provided with temperature responsive operating blades, the positions of said blades with reference to said wheel depending upon their temperature, a duct for conveying said fluid, said turbine wheel being located outside of said duct, a relatively narrow sampling scoop extending across substantially the full width of said duct for picking up fluid from said duct from various sections of an area extending normal to the line of flow of said fluid, means for directing the fluid picked up by said scoop through said blades and then returning it to said duct, and means controlled by said wheel for controlling the temperature of said fluid.

5. A control device for controlling a flowing fluid comprising, a duct through which said fluid flows, a turbine wheel in said duct having blades acted upon by the flowing fluid so as to control the rotation of said wheel, said blades being thermally responsive to the temperature of said fluid so that their positions with reference to the wheel vary with temperature changes both to control the speed of said wheel and also its direction of rotation depending upon whether said temperature is above or below a predetermined value, a control element actuated by said wheel for controlling the temperature of said fluid, and means for changing the direction of the fluid as it approaches said blades in order to adjust the value of said predetermined temperature.

6. A control device for controlling a flowing fluid comprising, a duct through which fluid flows, a turbine wheel in said duct having blades acted upon by the flowing fluid so as to control the rotation of said wheel, said blades being thermally responsive to the temperature of said fluid so that their positions with reference to the wheel vary with temperature changes both to control the speed of said wheel and also its direction of rotation depending upon whether said temperature is above or below a predetermined value, means actuated by said wheel for controlling the temperature of said fluid to hold a substantially constant temperature therein, a plurality of inlet guide vanes for controlling the direction of the flow of fluid to said turbine wheel blades, and means for changing the positions of said inlet guide vanes to change said direction of flow and thereby adjust the value of said predetermined temperature.

7. A control unit for insertion into a fluid duct to control the flow of fluid in the duct in accordance with the temperature of the fluid comprising, a duct member constructed and arranged to be connected in the duct and through which the fluid will flow when connected, a valve movable between open and closed positions to control the flow of fluid through said duct member, an impulse turbine wheel with impulse blades thereon, means connecting said wheel with said valve for moving it between said positions, the movement of the valve toward its closed or opened positions depending upon the rotation of said wheel in one direction or the other, means for directing fluid flowing in said duct into contact with said blades, and said blades being formed of a bimetallic thermostatic material so that their curvature depends upon the temperature of said fluid, the blades curving from a predetermined position corresponding to a corresponding temperature when the temperature of said valve increases to rotate said wheel in one direction and curving in the opposite direction from said predetermined position when the temperature of said fluid decreases so as to rotate said wheel in the opposite direction, and said blades taking a position when the temperature of said fluid corresponds to said predetermined temperature so as to hold said wheel stationary.

8. A control device for controlling the rate of flow of a fluid in accordance with its temperature comprising, a duct through which the fluid is caused to flow, a pair of shutters having parallel driving shafts, a pair of pulleys secured to said shutters respectively, a non-extensible cord tightly and reversely wound on said pulleys with its opposite ends secured to said pulleys, said cord thereby providing a driving connection between said shafts whereby when one is rotated the other is driven by it but in the reverse direction, a turbine wheel connected to said one shaft to drive it, means for directing the controlled fluid to flow through the blades of said wheel, and temperature responsive means adapted to respond to the temperature of said fluid for adjusting the effective positions of said blades on said wheel in accordance with said temperature.

9. A temperature control device for controlling a flowing fluid comprising, a turbine wheel provided with actuating blades that control the direction of rotation of said wheel and its speed of rotation, flow directing means for directing the controlled fluid through said blades, control means for controlling the rate of flow of said fluid, connection means between said wheel and said control means for controlling the operation of said control means to control said rate of flow in accordance with the operation of said wheel, and temperature responsive means adapted to respond to the temperature of said fluid for adjusting the effective positions of said blades on said wheel in order to control the operation thereof either to stop or to rotate and also to control the direction of rotation when it rotates.

10. A control device for a fluid comprising a turbine wheel provided with actuating blades the position of which is adjustable to vary the speed of rotation of said wheel and its direction of rotation, a duct for conveying said fluid, a sampling scoop for picking up fluid from said duct from various sections of an area extending crosswise thereof, means directing the fluid picked up by said scoop through said blades, means operated by said wheel for controlling the temperature of said fluid, and temperature responsive means adapted to respond to the temperature of said fluid for adjusting the effective positions of said blades on said wheel both to control the direction of rotation and speed of operation of said wheel.

11. A control device for controlling flowing fluid comprising a turbine wheel having blades acted upon by the flowing fluid so as to control the rotation of said wheel, means responsive to the temperature of said fluid for controlling the positions of said blades on said wheel both to control the speed of said wheel and also its direction of rotation depending upon whether said temperature is above or below a predetermined value, a control element actuated by said wheel for effecting temperature control of said fluid, and means for controlling the direction of the fluid flow as it approaches said blades in order to adjust the value of said predetermined temperature.

12. A control device for controlling a flowing fluid comprising a turbine wheel provided with actuating blades that control the direction of rotation of said wheel and its speed of rotation, flow directing means for directing the controlled fluid through said blades, control means for controlling the rate of flow of said fluid, connection means between said wheel and said control means for controlling the operation of said control means to control said rate of flow in accordance with the operation of said wheel, and means responsive to a condition of the controlled fluid that is controllable by the rate of flow thereof for adjusting the effective positions of said blades on said wheel in order to control its operation.

13. A temperature control device for controlling a flowing fluid comprising, a duct through which fluid flows, a turbine wheel in said duct having blades acted upon by the flowing fluid so as to control the rotation of said wheel, temperature responsive means adapted to respond to the temperature of said fluid for adjusting the positions of said blades with reference to the wheel in accordance with temperature changes both to control the speed of said wheel and also the direction of rotation thereof depending upon whether said temperature is above or below a predetermined value, a temperature control element for said fluid for effecting the control of the temperature thereof, and a driving connection between said wheel and said temperature control element so that the element is operated by said wheel to hold a substantially constant temperature in said fluid.

JAMES R. CAMPBELL.

REFERENCES CITED

The following references are of record in the file of this patent:

UNITED STATES PATENTS

| Number | Name | Date |
| --- | --- | --- |
| 2,114,567 | Mercur | Apr. 19, 1938 |
| 2,316,940 | Dewey et al. | Apr. 20, 1943 |
| 1,015,552 | Gamon | Jan. 23, 1912 |
| 1,782,073 | Piquerez | Nov. 18, 1930 |
| 1,138,854 | Edgecombe | May 11, 1915 |
| 1,724,209 | Lieber | Aug. 13, 1929 |
| 2,213,582 | Hall | Sept. 3, 1940 |
| 2,352,786 | Hammond, Jr. et al. | July 4, 1944 |
| 2,225,209 | Dewey | Dec. 17, 1940 |